UNITED STATES PATENT OFFICE.

LÉON DESVAUX AND HENRI ALLAIRE, OF PARIS, FRANCE.

PLASTIC PRODUCT.

No. 929,660. Specification of Letters Patent. Patented Aug. 3, 1909.

Application filed February 4, 1909. Serial No. 476,064.

*To all whom it may concern:*

Be it known that we, LÉON DESVAUX and HENRI ALLAIRE, citizens of the Republic of France, residing at 32 Rue Saint-Lambert, and 13 Rue de la Comète, Paris, France, respectively, have invented new and useful Improvements in Improved Plastic Products, of which the following is a specification.

The present invention has for its object a new plastic product for the manufacture of combs, molded objects of any kind and other applications.

The invention consists in the application to the manufacture of plastic products, and particularly to products of which celluloid is the base, of a material extracted from maize, and which has, up to the present, been utilized only as a food product.

In the application to celluloid the elements which constitute the substance known as celluloid, that is to say nitrocellulose and camphor or any suitable substitute for the latter material, are added in varying proportion to a particular albuminoid which is extracted from maize and which has the property of dissolving in the ordinary solvents of the said elements.

None of the albuminous substances hitherto employed in addition to the celluloid or as a substitute for the whole or a part of its elements will product a substance comparable to pure celluloid, by reason of lack of solubility in the solvents of one or other of the principal constituent elements of the product.

The material in question, is obtained by treating maize with higher alcohols such as amyl alcohol and is known as a food product under the name of "maizine". It forms the subject of Patent No. 744510 granted to Donard and Labbé.

For the manufacture of the new plastic products, the maizine may advantageously be employed as follows:—To a mixture of nitrocellulose and camphor dissolved in alcohol in proportions which may be greatly varied, for example, three parts by weight of nitrocellulose and one part by weight of camphor, are added, for example three parts by weight of "maizine", previously moistened with alcohol. The compound is mixed by stirring, and then worked up by the ordinary processes employed in the manufacture of celluloid and other like plastic products, viz., rolling, pressing and the like. The maizine replaces a corresponding part of the nitrocellulose and camphor that form pure celluloid, without any deterioration in the quality of the product, for the reason, already given, that it is soluble in the solvents of both the elements, and forms no precipitate in the entire mass. The final product is perfectly homogeneous and translucid, is far less combustible than celluloid, and the net cost is much lower.

The product can of course be colored by the ordinary means, and subsequently inert bodies may be added thereto. Moreover the proportions of the nitrocellulose, camphor or the substitute for camphor and of the maizine may be varied at will according to the particular use for which the product is designed.

We claim:

1. As a new article of manufacture, a plastic product such as herein described consisting of celluloid and an albuminoid product extracted from maize which is soluble in the solvents of the elements of celluloid.

2. As a new article of manufacture, a plastic product consisting of nitrocellulose, camphor or its substitutes, and maizine, the latter being an albuminoid product extracted from maize and soluble in the solvents of both nitrocellulose and camphor or its substitutes.

3. As a new article of manufacture, a plastic product consisting of three parts by weight of nitrocellulose, one part by weight of camphor and three parts by weight of maizine previously moistened with alcohol.

In testimony whereof we have signed our names to this specification in the presence of two subscribing witnesses.

LÉON DESVAUX.
HENRI ALLAIRE.

Witnesses:
HENRI MONIN,
H. C. COXE.